United States Patent
Sharma et al.

(10) Patent No.: US 6,617,275 B1
(45) Date of Patent: Sep. 9, 2003

(54) PROCESS FOR PREPARING A CATALYST FOR AROMATIC PRODUCTION

(75) Inventors: Sanjay B. Sharma, Burr Ridge, IL (US); John Kulach, Chicago, IL (US); Aaron James Imrie, Des Plaines, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 10/022,107

(22) Filed: Dec. 13, 2001

Related U.S. Application Data

(62) Division of application No. 09/466,452, filed on Dec. 17, 1999, now abandoned.

(51) Int. Cl.$^7$ .................. B01J 29/06; B01J 29/40
(52) U.S. Cl. .................. 502/61; 502/64; 502/71; 502/73; 502/77
(58) Field of Search .................. 502/61, 64, 71, 502/73, 77

(56) References Cited

U.S. PATENT DOCUMENTS

| | | | |
|---|---|---|---|
| 4,157,356 A | | 6/1979 | Bulford et al. ............. 585/415 |
| 4,180,689 A | * | 12/1979 | Davies et al. ............. 585/407 |
| 4,350,835 A | | 9/1982 | Chester et al. ............. 585/415 |
| 4,629,717 A | | 12/1986 | Chao ............. 502/208 |
| 4,636,483 A | | 1/1987 | Kjell et al. ............. 502/61 |
| 4,642,403 A | * | 2/1987 | Hyde et al. ............. 585/415 |
| 4,654,455 A | | 3/1987 | Chao ............. 585/415 |
| 4,746,763 A | | 5/1988 | Kocal ............. 585/415 |
| 4,806,700 A | * | 2/1989 | Martindale ............. 585/322 |
| 4,855,522 A | | 8/1989 | Diaz ............. 585/417 |
| 4,861,930 A | * | 8/1989 | Cottrell et al. ............. 585/317 |
| 4,945,175 A | * | 7/1990 | Hobbs et al. ............. 585/417 |
| 5,034,363 A | * | 7/1991 | Petit et al. ............. 502/61 |
| 5,149,679 A | * | 9/1992 | Price et al. ............. 502/61 |
| 5,169,812 A | | 12/1992 | Kocal et al. ............. 502/61 |
| 5,212,127 A | | 5/1993 | Kocal et al. ............. 502/26 |
| 6,008,423 A | * | 12/1999 | Holmgren et al. ............. 585/475 |
| 6,383,967 B1 | * | 5/2002 | Holmgren et al. ............. 502/64 |

FOREIGN PATENT DOCUMENTS

| | | | |
|---|---|---|---|
| GB | 1 496 379 | 12/1977 | ............. C07C/3/34 |

* cited by examiner

Primary Examiner—Tom Dunn
Assistant Examiner—Christina Ildebrando
(74) Attorney, Agent, or Firm—John G. Tolomei; Frank S. Molinaro

(57) ABSTRACT

A novel process for converting $C_2$ to $C_6$ aliphatic hydrocarbons to aromatics and catalyst for use in this process are disclosed. The catalyst that contains a zeolite having a silica to alumina molar ratio greater than about 20 and a pore diameter from about 5 Å to about 6 Å, an essentially non-acidic binder, and a gallium component. The binder is selected from silica, zirconia, titania, and mixtures thereof and results in a catalyst formulation having both enhanced selectivity to desired $C_6$–$C_9$ aromatic products and improved stability compared to prior art compositions. Preferred zeolites that can be used include those of the MFI structure type, with ZSM-5 being a specific example.

14 Claims, 1 Drawing Sheet

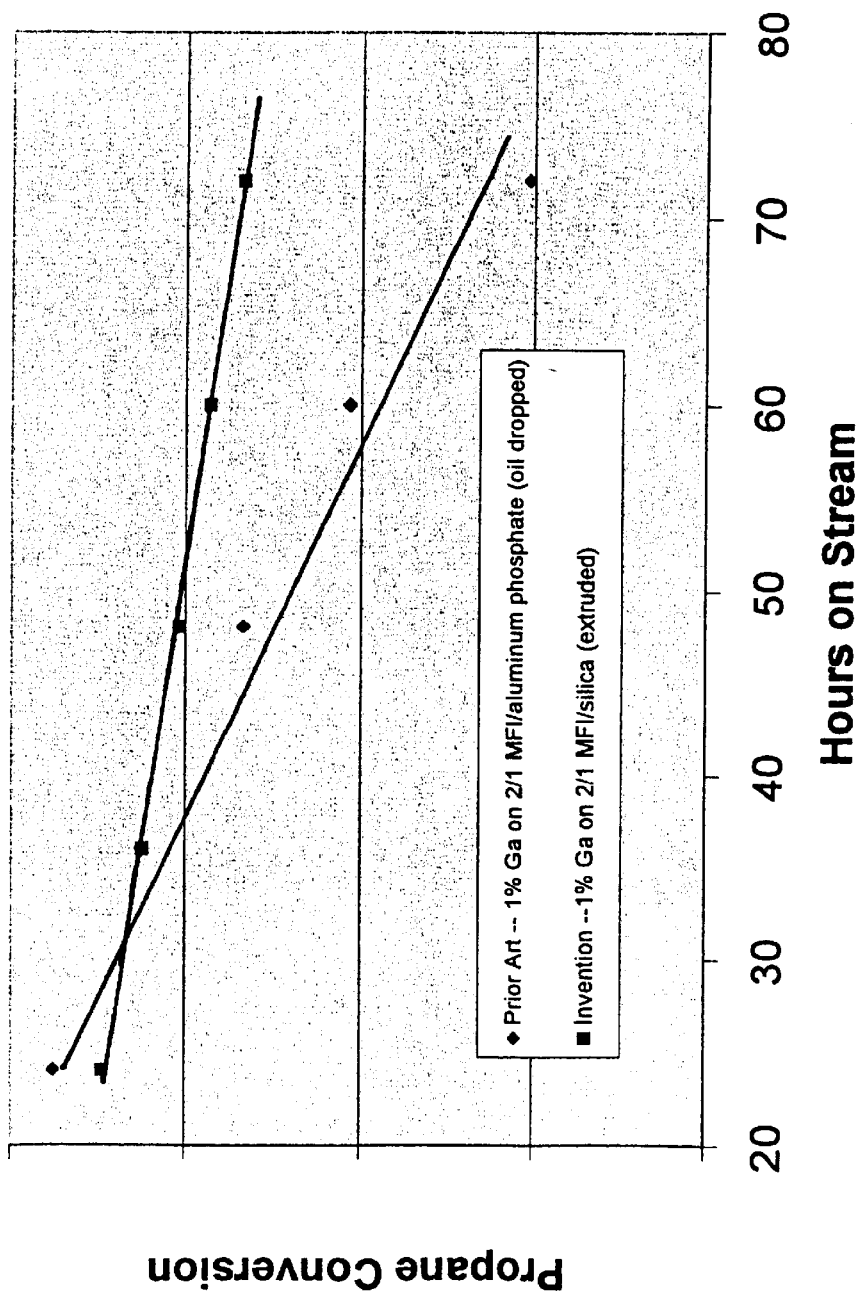

PROCESS FOR PREPARING A CATALYST FOR AROMATIC PRODUCTION

CROSS-REFERENCE TO RELATED APPLICATION

This application is a division of U.S. application Ser. No. 09/466,452 filed on Dec. 17, 1999, now abandoned the contents of which are hereby incorporated by reference.

FIELD OF THE INVENTION

The present invention relates to a process and novel catalyst for the production of aromatics from a feed stream comprising $C_2$–$C_6$ aliphatic hydrocarbons. The disclosed dehydrocyclodimerization process uses a zeolite catalyst having an essentially inert binder (e.g. silica). Minimization of non-selective acid sites of the binder material significantly improves both the catalyst activity and stability.

BACKGROUND OF THE INVENTION

Dehydrocyclodimerization is a process in which aliphatic hydrocarbons containing from 2 to 6 carbon atoms per molecule are reacted over a catalyst to produce an aromatic product and hydrogen. Normal downstream separations will typically yield, in addition to the major $C_6$–$C_9$ aromatic product stream, a light ends byproduct containing hydrogen for purge and recycle, an unconverted $C_2$–$C_4$ product for recycle, and a trace $C_4^+$ non-aromatic byproduct. This process is well known and the associated background and details are given in U.S. Pat. No. 4,654,455 and U.S. Pat. No. 4,746,763, hereby incorporated by reference. Typically, the dehydrocyclodimerization reaction is carried out at temperatures in excess of 500° C. using dual functional catalysts containing acidic and dehydrogenation components.

In British patent 1496379, the acidic function is provided by a surface active oxide such as hydrated silica or hydrated alumina having hydroxyl groups that may be ion-exchanged with a metal having the requisite dehydrogenation function (e.g. gallium). Alternatively, the metal may be impregnated onto the acidic support as a metal oxide. In this case, ion exchange capacity of the support is not needed, so that various forms of alumina (e.g. eta-alumina) may be used. Silica is also mentioned as a suitable support, although this material alone lacks the appreciable acidity required for the dehydrocyclodimerization reaction. Trace amounts of contaminant alumina may improve the support acidity, but not significantly. In U.S. Pat. No. 4,157,356, silica is again referenced as a preferred catalyst support, either with or without surface hydroxyl groups, depending upon whether metal loading is to be achieved via ion-exchange (former case) or metal oxide impregnation (latter case). The silica support here is characterized as having a surface area of greater than 500 $m^2$/g and a pore volume of less than 0.8 ml/g.

In U.S. Pat. No. 4,855,522, a zeolitic catalyst composition for the production of aromatics from $C_2$, $C_3$, and $C_4$ paraffinic hydrocarbons is disclosed. Specifically, the catalyst comprises a crystalline aluminosilicate having a molar $SiO_2$/$Al_2O_3$ ratio of at least 5:1 and is loaded with both a gallium compound and at least one rare earth metal (e.g. lanthanum). The novelty of this formulation lies in the rare earth additive, which is taught to improve aromatic selectivity compared to that achieved using conventional gallium zeolitic catalysts. It is further mentioned that the zeolite may be bound with silica or alumina. A second example of a zeolite and gallium containing catalyst that may be bound with silica is provided in U.S. Pat. No. 4,350,835 for converting gaseous feed stocks containing ethane to liquid aromatics.

For the reaction of concern in the present invention, however, namely the dehydrocyclodimerization of $C_2$–$C_6$ aliphatic hydrocarbons, the prior art fails to disclose and recognize the advantages associated with a gallium containing zeolite catalyst having an essentially non-acidic binder. Appropriate binders are selected from the group consisting of silica, zirconia, titania, and mixtures thereof. Because these materials are essentially devoid of acidic sites, undesired side reactions leading to reaction products other than $C_6$–$C_9$ aromatic compounds are greatly reduced. Such non-selective products include cracked hydrocarbons such as methane as well as high boiling aromatic compounds such as naphthalene. Furthermore, the acidity of the zeolite component of the catalyst may be reduced during synthesis through a steaming procedure to cause a desired amount of zeolite dealumination. Overall, the substantial improvement in selectivity to aromatics obtained in the dehydrocyclodimerization process of the present invention has important commercial implications in terms of product yields and catalyst life.

Of significant industrial importance currently for this dehydrocyclodimerization process is the catalyst disclosed in U.S. Pat. No. 4,636,483 comprising a crystalline aluminosilicate, gallium, and phosphorus containing alumina as a binder. Compared to other known dehydrocyclodimerization catalysts, a principal benefit of this composition is the binder material, which increases aromatic selectivity and also significantly improves catalyst life through a reduction in detrimental carbonaceous byproduct (i.e. coke) formation. Furthermore, the aluminum phosphate binder is conveniently prepared by combining an alumina hydrosol with a phosphorous compound to modify the sol prior to gellation. Details of this procedure are provided in U.S. Pat. No. 4,629,717.

One particular drawback associated with the use of this phosphorous containing alumina binder, however, is described in U.S. Pat. No. 5,212,127 where catalysts incorporating this material are subject to deactivation through extended exposure to hydrogen at temperatures exceeding 500° C. Unfortunately, the preferred environment for the dehydrocyclodimerization reaction encompasses these conditions. Applicants have found that the use of an essentially non-acidic binder (e.g. silica) rather than phosphorous containing alumina in the catalyst composition described in U.S. Pat. No. 4,636,483 prevents the aforementioned deactivation due to high temperature hydrogen exposure. Thus, the need for either a catalyst reactivation step as described in the '127 patent or a pretreatment as described in U.S. Pat. No. 5,169,812 is eliminated.

The prior art catalyst formulation using an aluminum phosphate binder provides some degree of selectivity improvement over catalysts incorporating a more acidic binder, such as a conventional alumina binder. While aluminum phosphate is less acidic than alumina, it nevertheless contains some acidity that is detrimental in the dehydrocyclodimerization process of the present invention. It is now understood that an essentially complete elimination of catalyst binder acidity is necessary to minimize unwanted side reactions. In accordance with this understanding, the use of a nonacidic binder for the zeolitic catalyst of the present invention represents a further advancement in the art regarding dehydrocyclodimerization catalyst coking reduction. Applicants have found that the essential elimination of acidic sites on the binder surface greatly reduces the production of acid-catalyzed, non-selective heavy aromatics (e.g. naphthalenes) that are known coke precursors. Confining catalyst acidity, which is necessary to carry out the dehydrocyclodimerization reaction, to the zeolite micropores yields relatively more of only the desired shape selective aromatic products (e.g. benzene, toluene, xylenes) and relatively fewer of the non-selective coke precursors. Larger molecules do not easily diffuse from the microporous channels of the medium pore (5–6 Å) zeolite used in the catalyst of the present invention. During catalyst preparation, steaming of the zeolite can be effective for reducing acidity of the zeolite itself through dealumination.

Overall, compared to prior art formulations, the gallium containing zeolite catalyst having an essentially non-acidic binder provides a significantly reduced deactivation rate under dehydrocyclodimerization conditions, which is a principal object of this invention. This stability enhancement results from both a decreased production of coke-forming byproducts as well as high tolerance to the deleterious effects of high temperature hydrogen exposure. As a result, regeneration cycles are extended significantly, allowing for the potential use of a simple, fixed bed operation, in contrast to the current standard reactor technology employing more complex continuous catalyst regeneration.

SUMMARY OF THE INVENTION

In one embodiment, therefore, the present invention is a process for the dehydrocyclodimerization of $C_2$–$C_6$ aliphatic hydrocarbons comprising contacting a feed stream with a catalyst comprising a gallium component, a zeolite support having a silica to alumina molar ratio greater than about 20 and a pore diameter from about 5 Å to about 6 Å, and an essentially non-acidic binder at dehydrocyclodimerization conditions to yield a hydrogen gas stream and a product stream containing $C_6$–$C_9$ aromatic compounds.

In a more specific embodiment the present invention is a process for the dehydrocyclodimerization of $C_2$–$C_6$ aliphatic hydrocarbons comprising contacting a feed stream with a catalyst comprising a gallium component, an MFI structure type zeolite support having a silica to alumina molar ratio greater than about 20 and a pore diameter from about 5 Å to about 6 Å, and a silica binder at dehydrocyclodimerization conditions to yield a hydrogen gas stream and a product stream containing $C_6$–$C_9$ aromatic compounds, present in an amount of least about 50% of the weight of the converted $C_2$–$C_6$ aliphatic hydrocarbons.

In another embodiment the present invention is a process for preparing a catalyst for the dehydrocyclodimerization of $C_2$–$C_6$ aliphatic hydrocarbons, the process comprising forming a bound zeolite comprising a zeolite having a silica to alumina molar ratio greater than about 20 and a pore diameter from about 5 Å to about 6 Å, and an essentially non-acidic binder; calcining the bound zeolite at a temperature from about 450° C. to about 700° C. for a period from about 1 to about 20 hours to yield a calcined composite; contacting the calcined composite with an aqueous solution of a gallium metal salt selected from the group consisting of gallium nitrate, gallium chloride, gallium bromide, gallium hydroxide, and gallium acetate to yield a gallium-impregnated composite; reducing the gallium-impregnated composite at a temperature from about 400° C. to about 700° C. for a period from about 1 to about 10 hours in a hydrogen-containing gas to yield a reduced gallium impregnated composite; and oxidizing the reduced gallium impregnated composite at a temperature from about 400° C. to about 700° C. for a period from about 1 to about 10 hours in an oxidizing atmosphere comprising air and steam where the steam is present in an amount from about 1% to 100% of saturation to yield the catalyst.

In a final embodiment the present invention is a catalyst made by the above-described process.

BRIEF DESCRIPTION OF THE DRAWING

The FIGURE illustrates graphically the unexpected improvements in dehydrocyclodimerization catalyst stability obtainable using a 1% gallium-impregnated composite of 2:1 MFI structure type zeolite: silica binder catalyst of the present invention. The FIGURE shows catalyst activity as measured by propane conversion, predominantly to aromatics, over time in an accelerated stability test.

DETAILED DESCRIPTION OF THE INVENTION

As stated, this invention relates to a dehydrocyclodimerization process. The catalyst used in this process comprises a zeolite, an essentially non-acidic binder, and a gallium metal component. The zeolites that may be used are any of those having a silica to alumina molar ratio greater than about 20 and preferably greater than about 40 and a pore diameter of about 5 to about 6 Angstroms (Å). The silica to alumina molar ratio, of course, refers to the composition of the fundamental three dimensional network structure that characterizes the zeolite. It is also important to distinguish the silica to alumina ratio (or $SiO_2/Al_2O_3$ ratio) from another commonly used term in the art, the "Si/Al ratio", which is exactly half of the silica to alumina molar ratio. Specific examples of zeolites that can be used are those having known structure types, as classified according to their three-letter designation by the Structure Commission of the International Zeolite Association ("Atlas of Zeolite Structure Types", by Meier, W. M. Olsen, D. H; and Baerlocher, Ch., 1996) of MFI, MEL, MTW, MOR, and BEA. MFI structure type zeolites are preferred, with ZSM-5 being an especially preferred specific type of MFI zeolite. Other zeolites within the aforementioned structure types that are useful in the catalyst described herein include ZSM-8, ZSM-11, ZSM-12 and ZSM-35, mordenite, beta, and MCM-22.

The preparation of the preferred MFI structure type zeolites by crystallizing a mixture comprising an alumina source, a silica source and an alkali metal source is well known in the art. Conversion of an alkali-metal-form zeolite to the hydrogen form may be performed by treatment with an aqueous solution of a mineral acid. Alternatively, hydrogen ions can be incorporated into the zeolite by ion exchange with ammonium salts such as ammonium hydroxide or ammonium nitrate followed by calcination.

Although the zeolite content of the catalyst can vary considerably, it is usually present in an amount from about 30 to about 90 weight percent and preferably from about 50 to about 70 weight percent of the catalyst. A second constituent of the catalyst of this invention is an essentially non-acidic binder for the zeolite. The characterization of a particular solid material in terms of its acidic or basic properties is described in detail in Satterfield, *Heterogeneous Catalysis in Practice*, McGraw-Hill, pp. 151–153. Suitable binders having the characteristic of being non-acidic and thus acting as an inert material that is essentially refractory in the dehydrocyclodimerization conditions of the present invention are silica, zirconia, titania, and mixtures thereof. These refractory binder or matrix materials also have favorable properties in terms of facilitating fabrication of the dehydrocyclodimerization catalyst, providing strength, and reducing fabrication costs. Of these binder materials, amorphous silica is preferred in practice due to its ready availability and low cost. An especially preferred amorphous silica is a synthetic, white, amorphous silica (silicon dioxide) powder that is classified as wet-process, hydrated silica. This type of silica is produced by a chemical reaction in a water solution, from which it is precipitated as ultra-fine, spherical particles. It is preferred that the BET surface area of the silica is in the range from about 300–800 $m^2/g$.

Of course, while minimization of binder acidity is an objective, the acidity of the binder cannot be completely eliminated, due to binder impurities that provide acid sites. For example, commercially available sources of silica typically contain 500–700 ppm of alumina that imparts acidity. For this reason, the binder materials used in preparing the various embodiments of the catalyst of the present invention are characterized as being essentially non-acidic.

The above mentioned binders should be first mixed with the zeolite to provide a homogeneous mixture. Depending on the subsequent forming procedure used to form a bound zeolite, various additives may be optimally incorporated into the zeolite/binder mixture to improve the characteristics of the mixture for forming purposes. For example, if the well-known extrusion method is used for forming, a suitable peptizing agent can optimally be added to the mixture of zeolite and binder. As understood in the art, the zeolite at this point may or may not be already impregnated with a catalytically active metallic component (e.g. gallium). The mixing of zeolite, binder, and additives is carried out to form a homogeneous dough or thick paste having the correct moisture content to allow for the formation of extrudates with acceptable integrity to withstand direct calcination. Extrudability is determined from an analysis of the moisture content of the dough or mixture, with a moisture content in the range of 30–50% by weight being preferred. For any given method of forming a bound zeolite, those skilled in the art will readily understand the relationship between the initial zeolite/binder ratio used in the initial mixture and the zeolite, binder ratio in the resulting finished catalyst.

The extrusion procedure is in fact a preferred method of forming a bound zeolite with physical properties (e.g. shape, strength) suitable for use in the dehydrocyclodimerization process. After mixing the zeolite, binder, and optimal additives to form a dough, the dough is extruded through a die pierced with multiple holes and the spaghetti-shaped extrudate of zeolite and binder is cut to form particles in accordance with techniques well known in the art. Multitudes of different extrudate shapes are possible, including, but not limited to, cylinders, cloverleaf, dumbbell and symmetrical and asymmetrical polylobates. It is certainly possible to form other cross sectional shapes; the main objective is to reduce the gross diffusional path of $C_2$–$C_6$ aliphatic hydrocarbon reactants to the active gallium metal sites within the zeolite micropores. Typically, pellet or pill forms are used.

If spherical catalyst particles are desired, the preferred method of forming a bound zeolite is according to the well-known "oil-dropping" technique for combining the zeolite and essentially non-acidic binder. In this case, the initial mixing of zeolite and binder involves the synthesis of an appropriate sol, or carrier material, of the binder used for suspending the zeolite. Details of this technique are provided in U.S. Pat. No. 2,620,314, incorporated herein by reference. In the case of the silica, zirconia, or titania essentially non-acidic binders mentioned for producing the catalyst of the present invention, it is appropriate to use an acidic hydrosol that can be gelled using the type of temperature-activated gelling agent set forth in the '314 patent. Preferred temperature-activated gelling agents are hexamethylene tetraamine (HMT), urea, and mixtures thereof.

After combining these gelling agents with the hydrosol, the formation of spherical bound zeolite particles involves dispersing the zeolite/hydrosol/gelling agent mixture into an oil bath or tower that has been heated such that gellation occurs. The combined mixture preferably is dispersed into the oil bath as droplets from a nozzle, orifice, or rotating disk. In the elevated temperature oil bath environment, the gelling agents release ammonia that sets or converts the hydrosol spheres into hydrogel spheres. The spheres are then continuously withdrawn from the oil bath and typically subjected to specific aging and washing treatments in oil and ammoniacal solutions, respectively, to further improve their physical characteristics. For the formation of spherical catalyst shapes, the catalyst preferably should have an average diameter of less than about 1.0 mm, preferably from about 0.2 to about 0.8 mm. Those skilled in the art recognize the relationship between initial droplet size and final catalyst particle size.

It should be recognized that in some cases silica sols may gel without a gelling agent or even a substantial change in temperature. This type of sphere formation can also be applied to the catalyst preparation. Types of silica sols used to form a silica bound zeolite are commercially available as aquasols or organosols containing dispersed colloidal silica particles. For performing oil dropping with a silica sol, an inverted silica sol, produced by an acid addition technique and a basic gelling agent such as a mixture of urea and HMT, is preferred. When a zirconia binder is used for the catalyst preparation, the preferred starting acidic sol is an aqueous zirconium acetate solution, which is preferably combined with a urea gelling agent. When a titania binder is used, the acidic sol is preferably a solution of titanyl oxychloride, which is preferably combined with a urea gelling agent.

An important feature of the technique for forming catalyst particles is to avoid any significant binder blockage of the zeolite micropores by the sol. In the case of the present invention, this phenomenon, called "binder blinding", would cause binder interference with access of the $C_2$–$C_6$ aliphatic hydrocarbon compounds to the active gallium metal containing sites of the zeolite. To overcome this effect, it may be necessary to add an inert diluent, typically of somewhat smaller size than the zeolite powder, to the mixture of zeolite and binder prior to agglomerate formation. This diluent can act as a bridging material for the essentially non-acidic binder and zeolite, thus preserving the zeolite pore system. Typical inert diluents used to prevent binder blinding are non-colloidal silica and some types of clays resistant to low pH conditions. An essential feature of the present invention, of course, is that the chemical characteristics of the essentially non-acidic binder are properly matched with those of the zeolite.

In addition to the aforementioned extrusion and "oil dropping" methods that involve mixing the zeolite and essentially non-acidic binder and thereafter forming bound zeolite particles, other means known in the art to achieve these objectives may also be employed. Such techniques include gellation, pilling, nodulizing, marumerizing, and spray drying, or any combination of these. If spray drying is chosen, bound zeolite particles may be formed by spray-drying the zeolite and binder mixture at a temperature of from about 425° to 760° C. In any event, conditions and equipment should be selected to obtain appropriately sized particles.

Regardless of the method used for combining the zeolite and binder to yield a bound zeolite, the resulting particles should be dried at about 80° C. to about 150° C. for several hours and then calcined in dry air. Typically, the initial forming stage in the production of extrudates, beads, pellets, or other shapes yields "green" particles of the bound zeolite which posses sufficient strength for the subsequent calcination step. Calcination of the bound zeolite, for the purpose of setting the binder and activating the zeolite, yields a calcined composite. The temperatures most commonly used for this calcination or firing step range from about 450° C. to about 700° C., preferably from about 600° C. to about 650° C. The calcination temperatures are maintained for a period from about 1 to about 20 hours.

The calcined composite is optimally subjected to steaming to tailor or adjust its acid activity. The steaming may be effected at any stage of the catalyst preparation process but usually is carried out on the calcined composite of zeolite and binder prior to incorporation of the catalytic metal (gallium) component. Steaming comprises subjecting the calcined composite to a steaming atmosphere comprising steam present in an amount from about 5 to about 100% of the saturation level. Other conditions for steaming include an absolute pressure from about 1 to about 20 atmospheres, and a temperature from about 600° C. to about 1200° C. The steaming temperature is preferably from about 650° to about 1000° C. and more preferably from about 750° C. to about 850° C. The steaming should be carried out for a period of at least about one hour, preferably from about 6 to about 48 hours.

Alternatively or in addition to the steaming, the calcined composite may be washed with one or more of a wash solution of ammonium nitrate, a mineral acid, and/or water. Considering the first alternative, the catalyst may be washed with a solution containing from about 5 to about 30% by weight of ammonium nitrate. When acid washing is employed, a mineral acid such as HCl or $HNO_3$ is preferred; sufficient acid is added to maintain a pH from about 1 to about 6, preferably from about 1.5 to about 4. The catalyst is maintained in a bed over which the solution and/or water is circulated for a period from about 0.5 to about 48 hours, and preferably from about 1 to about 24 hours. The washing may be effected at any step in the catalyst preparation, and two or more stages of washing may be employed.

Prior to addition of the catalytic metal component the calcined composite preferably is ion-exchanged with an ion-exchange solution of a salt containing at least one hydrogen-forming cation such as $NH_4^+$ or a quaternary ammonium ion. The hydrogen-forming cation replaces principally alkali-metal cations to provide, after calcination, the hydrogen form of the zeolite component.

As mentioned, the binder is typically present in the calcined composite in an amount of less than about 70% by weight, preferably between about 10% and about 70% by weight of the binder and zeolite combined. Therefore, where a bound gallium containing zeolite is used for the catalyst of the present invention, the zeolite should comprise more than about 30%, and usually from about 30% to about 90%, of the catalyst weight, not considering the weight of the active gallium metal (metal-free basis).

Another necessary constituent of the instant catalyst is a gallium component. The gallium component may be deposited onto the calcined composite of zeolite and binder in any suitable manner known in the art that results in a uniform dispersion of the gallium. Usually the gallium is deposited onto the calcined composite by contacting (i.e. impregnating) it with an aqueous solution of a gallium metal salt, where the salt is selected from the group consisting of gallium nitrate, gallium chloride, gallium bromide, gallium hydroxide, gallium acetate, etc. The amount of gallium deposited onto the calcined composite normally varies from about 0.1 to about 5 percent by weight, expressed as gallium metal, of the finished catalyst. Those skilled in the art are cognizant of the contacting conditions (e.g. time, temperature, and solution concentration) required to achieve a desired loading of gallium on the finished catalyst.

The gallium compound may be impregnated onto the calcined composite by any technique known in the art such as by dipping the composite into a solution of the metal compound or by spraying such solution onto the composite. A preferred method of preparation involves the use of a steam-jacketed rotary dryer to achieve evaporative impregnation. The calcined composite particles are immersed in an impregnating solution of any of the previously mentioned gallium metal salts, where the composite and solution are contained in the dryer. The calcined composite is tumbled therein by rotation of the dryer, and evaporation of the impregnation solution in contact with the tumbling composite is expedited through the application of steam to the dryer jacket. Alternatively, the gallium component may also be impregnated directly onto the zeolite prior to binding it with the essentially non-acidic binder. This type of metal loading procedure confines the gallium component to the zeolite alone without incorporating any gallium into the binder.

After impregnation is complete and the resulting gallium-impregnated composite particles are completely dry, they are then heated in the presence of hydrogen-containing gas to a temperature from about 500° C. to about 700° C. for a time from about 1 to about 15 hours. Although pure hydrogen is preferred to reduce and disperse the gallium, the hydrogen may be diluted with nitrogen or other inert diluent to provide the necessary hydrogen-containing gas. Alternatively, it is envisioned that the reduction and dispersion can be performed in the actual reactor vessel (in situ) used for dehydrocyclodimerization using either pure hydrogen or a mixture of hydrogen and hydrocarbons. In either case, the reduced gallium-impregnated composite, resulting from the high temperature hydrogen treatment, is oxidized in an oxidizing atmosphere comprising air and steam at a temperature from about 400° C. to about 700° C. for a time from about 1 to about 10 hours. The amount of steam present in the air can vary from about 1 to about 100 percent of the saturation level. After oxidation, the zeolitic finished catalyst particles, bound with an essentially inert binder, now contain well-dispersed gallium in the form of gallium oxide.

In addition to gallium, other metals, referred to as catalyst promoter metals, may also be simultaneously or sequentially impregnated onto either the calcined composite or the zeolite component. This addition of a promoter metal is accomplished in substantially the same manner as the procedure described above for incorporating the gallium component onto the calcined composite or zeolite. The technique similarly comprises contacting the composite or zeolite with an aqueous solution containing the desired promoter metal in the form of a salt and subjecting the resulting promoter metal impregnated composite to hydrogen and air/steam environments. Promoter metals that may be used to enhance dehydrocyclodimerization activity and/or selectivity include indium, molybdenum, zinc, tin, and mixtures thereof.

The dehydrocyclodimerization conditions for use with the final finished catalyst will, of course, vary depending on such factors as feed stock composition and desired conversion. A normal set of conditions for the dehydrocyclodimerization of $C_2$–$C_6$ aliphatic hydrocarbons to aromatics includes a temperature from about 350° C. to about 650° C., an absolute pressure from about 1 to about 20 atmospheres, and a liquid hourly space velocity (LHSV) from about 0.2 hr$^{-1}$ to about 5 hr$^{-1}$. As understood in the art, LHSV is the hourly volumetric liquid feed flow rate divided by the catalyst volume. Preferred process conditions are a temperature from about 400° C. to about 550° C., an absolute pressure from about 2 to about 10 atmospheres, and a LHSV from about 0.5 hr$^{-1}$ to about 2.0 hr$^{-1}$. In general, one of requisite skill in the art will be able to adjust reaction conditions to suit the particular feed stock. It is understood, for example, that the temperature required for optimal dehydrocyclodimerization performance decreases with increasing average carbon number of the feed stream.

The feed stream to the dehydrocyclodimerization process is defined herein as all streams introduced into the dehydrocyclodimerization reaction zone. Included in such feed streams are $C_2$–$C_6$ aliphatic hydrocarbons. By $C_2$–$C_6$ aliphatic hydrocarbons is meant one or more non-aromatic ringed, straight, or branched chain isomers having from two to six carbon atoms per molecule. Furthermore, these hydrocarbons may be saturated or unsaturated. Preferably, the hydrocarbons $C_3$ and/or $C_4$ are selected from isobutane, normal butane, isobutene, normal butene, propane, and propylene. Diluents, including hydrogen, nitrogen, helium, argon, and neon may also be included in the feed stream. Typically, a recycle gas stream containing hydrogen is mixed with the feed stream before entering the reaction zone. It is known in the art that the presence of hydrogen, although negatively impacting the equilibrium conversion of aliphatic hydrocarbons to aromatics, significantly benefits the catalyst stability. Thus, normal practice in the dehydrocyclodimerization process mandates a separation of the hydrogen gas stream, which may contain gaseous reaction byproducts or potentially any of the aforementioned gaseous diluents, from the hydrocarbon product after reaction in the presence of the catalyst. This separation is accomplished through cooling of the reactor effluent to yield a liquid product stream containing $C_6$–$C_9$ aromatic compounds. Therefore, the primary product streams from the process described herein are a hydrogen gas stream and a liquid product stream. While the bulk of the hydrogen gas stream is recycled to the reactor, the net hydrogen production resulting from the dehydrocyclodimerization reaction is purged from this recycle loop along with some gaseous hydrocarbon byproduct impurities (e.g. methane).

According to the present invention, the feed stream is contacted with the instant catalyst in a dehydrocyclodimerization reaction zone maintained at dehydrocyclodimerization conditions. This contacting may be accomplished by using the catalyst in a fixed bed system, a moving bed system, a fluidized bed system, or a batch type operation. In view of the exceptional resistance to deactivation of the catalyst formulation of the present invention, a fixed bed of catalyst may be desired rather than a somewhat more complicated moving bed, such as the dense-phase moving bed system described in U.S. Pat. No. 3,725,249. In addition to simplicity of design, the fixed bed has the additional benefit of minimizing losses of valuable catalyst through attrition or breakage.

With either the fixed bed or dense-phase moving bed systems, the feed stream is preheated by any suitable means to the desired reaction temperature and then passed into a dehydrocyclodimerization zone containing a bed of the catalyst of the present invention. It is, of course, understood that the dehydrocyclodimerization catalyst may be retained in one or more separate reactors with suitable means therebetween to assure that the desired conversion temperature is maintained at the entrance to each reactor. It is also important to note that the $C_2$–$C_6$ aliphatic hydrocarbon reactants may be contacted with the catalyst bed in either upward, downward, or radial flow fashion with the latter being preferred. In addition, these reactants are essentially in the vapor phase when they contact the catalyst. The dehydrocyclodimerization system then preferably comprises a dehydrocyclodimerization zone containing one or more fixed or dense phase moving beds of the instant catalyst. In a multiple bed system, it is, of course, within the scope of the present invention to use the present catalyst in less than all of the beds with another dehydrocyclodimerization or similarly behaving catalyst being used in the remainder of the beds. This dehydrocyclodimerization zone may be one or more separate reactors with suitable heating means therebetween to compensate for any heat loss encountered in each catalyst bed. Specific to the dense-phase moving bed system, it is common practice to remove catalyst from the bottom of the reaction zone, regenerate it by conventional means known in the art, and then return it to the top of the reaction zone. Regardless of the operating conditions and the specific type of reactor configuration used, the catalyst of the present invention preferably provides about 50% selectivity to $C_6$–$C_9$ aromatic products. That is, of the $C_2$–$C_6$ aliphatic hydrocarbons in the feed that are converted in the dehydrocyclodimerization process of the present invention, preferably about 50% by weight are present as $C_6$–$C_9$ aromatic products in the product stream.

The following examples are presented in illustration of this invention and are not intended as undue limitations on the generally broad scope of the invention as set out in the appended claims.

COMPARATIVE EXAMPLE

A sample of currently used (i.e. prior art) catalyst was tested in a pilot plant to establish a baseline for dehydrocyclodimerization activity and stability. The catalyst composition was a 1% gallium formulation, where the active metal was loaded onto an MFI structure type zeolite bound with aluminum phosphate. The ratio of zeolite to binder was approximately 2:1. The catalyst was prepared according to the procedure described in U.S. Pat. No. 4,629,717 where an alumina hydrosol was initially mixed with a phosphorous-containing compound to yield a phosphorous modified sol. The sol was then gelled (in this case according to the aforementioned "oil dropping" technique described U.S. Pat. No. 2,620,314) to form a phosphorous modified alumina composite used as the catalyst support material.

The experiment was performed using dehydrocyclodimerization conditions within the preferred commercial operating ranges as defined previously. These parameters were designed so that the catalyst activity decline could be measured over a relatively short time frame. The feed used was pure propane.

The reactor effluent was analyzed by gas chromatography to determine its composition after 24 hours on stream and every 12 hours thereafter, up to 72 hours on stream. For each reactor effluent sample, the corresponding propane conversion and selectivity to desired aromatics was determined and plotted against the operating time on stream. Using linear regression to estimate relative activity decline, the catalyst tested in this example showed an average loss of 0.55% in conversion per hour of operation. From statistical analysis of the regression data the 95% confidence interval for this activity decay (i.e. stability) measurement was within +/−0.05% of the reported value.

EXAMPLE

Testing conditions identical to those of the Comparative Example were used to ascertain the relative performance of a dehydrocyclodimerization catalyst prepared according to the extrusion procedure set forth in the present invention. In this case, the catalyst composition was also a 1% gallium formulation. The binder material used in this case was amorphous silica rather than aluminum phosphate. The same 2:1 ratio of zeolite to binder was incorporated.

Although the starting conversion levels and overall aromatic selectivity values for the two catalysts were similar, the silica-bound catalyst of the present invention demonstrated vastly improved stability. Using linear regression to estimate relative activity decline, the novel catalyst of the present invention tested in this example showed an average loss of only 0.17% in conversion per hour of operation, compared to 0.55% reported for the prior art catalyst in the Comparative Example. Again, the 95% confidence interval for this activity decay (i.e. stability) measurement was within +/−0.05% of the reported value. The average selectivity to aromatics (percentage of aromatics in the converted product) during this test was identical to that measured in the Comparative Example. The remarkable stability enhancement achieved using the silica-bound catalyst therefore represents a significant improvement in the dehydrocyclodimerization art.

What is claimed is:

1. A process for preparing a catalyst for the dehydrocyclodimerization of $C_2$–$C_6$ aliphatic hydrocarbons, the process comprising:
   a) forming a bound zeolite comprising a zeolite having a silica to alumina molar ratio greater than about 20 and a pore diameter from about 5 Å to about 6 Å, and an essentially non-acidic binder;
   b) calcining the bound zeolite at a temperature from about 450° C. to about 700° C. for a period from about 1 to about 20 hours to yield a calcined composite;
   c) contacting the calcined composite with an aqueous solution of a gallium metal salt selected from the group consisting of gallium nitrate, gallium chloride, gallium bromide, gallium hydroxide, and gallium acetate to yield a gallium-impregnated composite;
   d) reducing the gallium-impregnated composite at a temperature from about 400° C. to about 700° C. for a period from about 1 to about 10 hours in a hydrogen-containing gas to yield a reduced gallium impregnated composite;
   e) oxidizing the reduced gallium impregnated composite at a temperature from about 400° C. to about 700° C. for a period from about 1 to about 10 hours in an oxidizing atmosphere comprising air and steam where the steam is present in an amount from about 1% to 100% of saturation to yield the catalyst.

2. The process of claim 1 where the bound zeolite is formed by extrusion or oil dropping.

3. The process of claim 1 where the calcined composite and gallium metal salt solution are contacted by evaporative impregnation.

4. The process of claim 1 further comprising contacting the calcined composite with an aqueous solution of a promoter metal salt where the promoter metal is selected from the group consisting of indium, molybdenum, zinc, tin, and mixtures thereof.

5. The process of claim 1 where, after step (b), the calcined composite is steamed at a temperature from about 600° C. to about 1200° C. and an absolute pressure from about 1 to about 20 atmospheres for a period of at least about 1 hour in a steaming atmosphere comprising steam present in an amount from about 5% to 100% of saturation.

6. The process of claim 5 further comprising contacting the calcined composite with an aqueous solution of a promoter metal salt where the promoter metal is selected from the group consisting of indium molybdenum, zinc, tin, and mixtures thereof.

7. The process of claim 1 where the process further comprises washing the calcined composite with a wash solution selected from the group consisting of ammonium nitrate, a mineral acid, and water.

8. The process of claim 1 where the calcined composite is ion-exchanged with an ion-exchange solution of a salt comprising a hydrogen-forming cation of ammonium ion or a quaternary ammonium ion.

9. The process of claim 8 further comprising contacting the calcined composite with an aqueous solution of a promoter metal salt where the promoter metal is selected from the group consisting of indium, molybdenum, zinc, tin, and mixtures thereof.

10. The process of claim 1 where the binder is selected from the group consisting of silica, zirconia, titania, and mixtures thereof.

11. The process of claim 10 where the binder is silica.

12. The process of claim 1 where the zeolite is an MFI structure type zeolite.

13. The process of claim 1 where the zeolite is present in amount from about 30% to about 90% by weight of the catalyst.

14. The process of claim 1 where the gallium metal is present in an amount from about 0.1% to about 5% by weight of the catalyst.

* * * * *